United States Patent
Kiyota

(10) Patent No.: US 8,103,859 B2
(45) Date of Patent: Jan. 24, 2012

(54) INFORMATION PROCESSING APPARATUS, CACHE MEMORY CONTROLLING APPARATUS, AND MEMORY ACCESS ORDER ASSURING METHOD

(75) Inventor: Naohiro Kiyota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/654,380

(22) Filed: Dec. 17, 2009

(65) Prior Publication Data
US 2010/0100710 A1    Apr. 22, 2010

Related U.S. Application Data

(63) Continuation of application No. PCT/JP2007/062389, filed on Jun. 20, 2007.

(51) Int. Cl.
*G06F 9/52* (2006.01)
(52) U.S. Cl. .............................. 712/225; 712/216
(58) Field of Classification Search .................. None
See application file for complete search history.

(56) References Cited

U.S. PATENT DOCUMENTS

| | | | | |
|---|---|---|---|---|
| 5,699,538 | A * | 12/1997 | Le et al. ........................ | 712/23 |
| 6,484,254 | B1 * | 11/2002 | Chowdhury et al. ......... | 712/216 |
| 6,591,342 | B1 * | 7/2003 | Akkary et al. ................ | 711/125 |
| 6,772,324 | B2 * | 8/2004 | Akkary et al. ................ | 712/235 |
| 6,938,130 | B2 * | 8/2005 | Jacobson et al. ............. | 711/144 |
| 2003/0033511 | A1 | 2/2003 | Akkary et al. | |
| 2004/0083351 | A1 * | 4/2004 | Merchant et al. ............. | 712/218 |
| 2005/0210204 | A1 | 9/2005 | Yamazaki | |
| 2006/0026371 | A1 | 2/2006 | Chrysos et al. | |
| 2006/0161738 | A1 * | 7/2006 | Saha et al. .................... | 711/150 |

FOREIGN PATENT DOCUMENTS

| | | |
|---|---|---|
| JP | 2006-48696 | 2/2006 |
| WO | 01/50256 A1 | 7/2001 |
| WO | 2004/003731 A1 | 1/2004 |
| WO | 2004/068361 | 8/2004 |
| WO | 2004/075052 A1 | 9/2004 |

OTHER PUBLICATIONS

Partial translation of Chinese Office action issued Jun. 9, 2011 in corresponding Chinese Patent Application 200780053369.7 (3 pages).*

(Continued)

*Primary Examiner* — Eric Coleman
(74) *Attorney, Agent, or Firm* — Staas & Halsey LLP

(57) ABSTRACT

According to an aspect of the embodiment, when data on a cache RAM is rewritten in a storage processing of one thread, an determination unit searches a fetch port which holds a request of another thread, checks whether a request exists whose processing is completed, whose instruction is a load type instruction, and whose target address corresponds to a target address in a storage processing. When the corresponding request is detected, the determination unit sets a re-execution request flag to all the entries of the fetch port from the next entry of the entry which holds the oldest request to the entry which holds the detected request. When the processing of the oldest request is executed, a re-execution request unit transfers a re-execution request of an instruction to an instruction control unit for the request held in the entry in which the re-execution request flag is set.

6 Claims, 11 Drawing Sheets

OTHER PUBLICATIONS

International Preliminary Report on Patentability mailed Jan. 7, 2010 in corresponding International Patent Application PCT/JP2007/062389.

International Search Report for PCT/JP2007/062389, mailed Mar. 11, 2008.

European Search Report dated Nov. 5, 2010 and issued in corresponding European Patent Application 07767228.5.

Chinese Office Action issued Jun. 9, 2011 in corresponding Chinese Patent Application 200780053369.7 (4 pages).

* cited by examiner

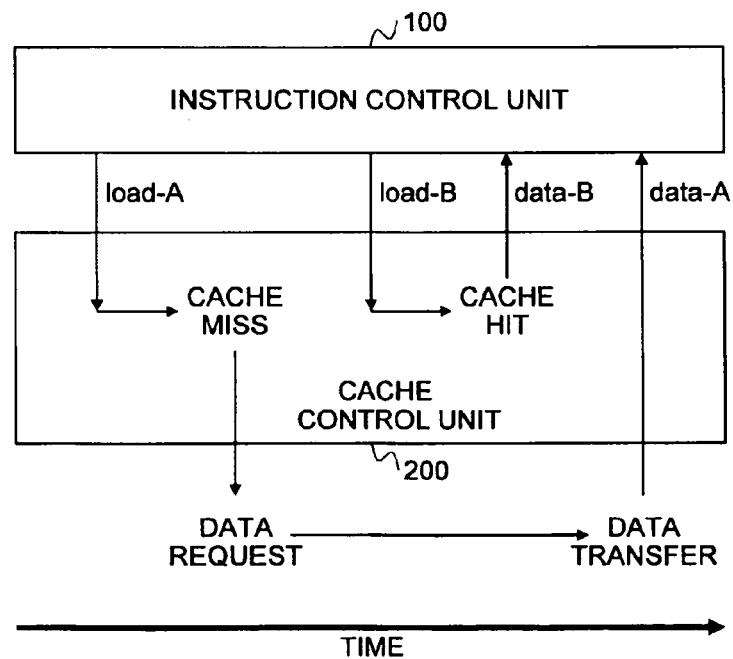

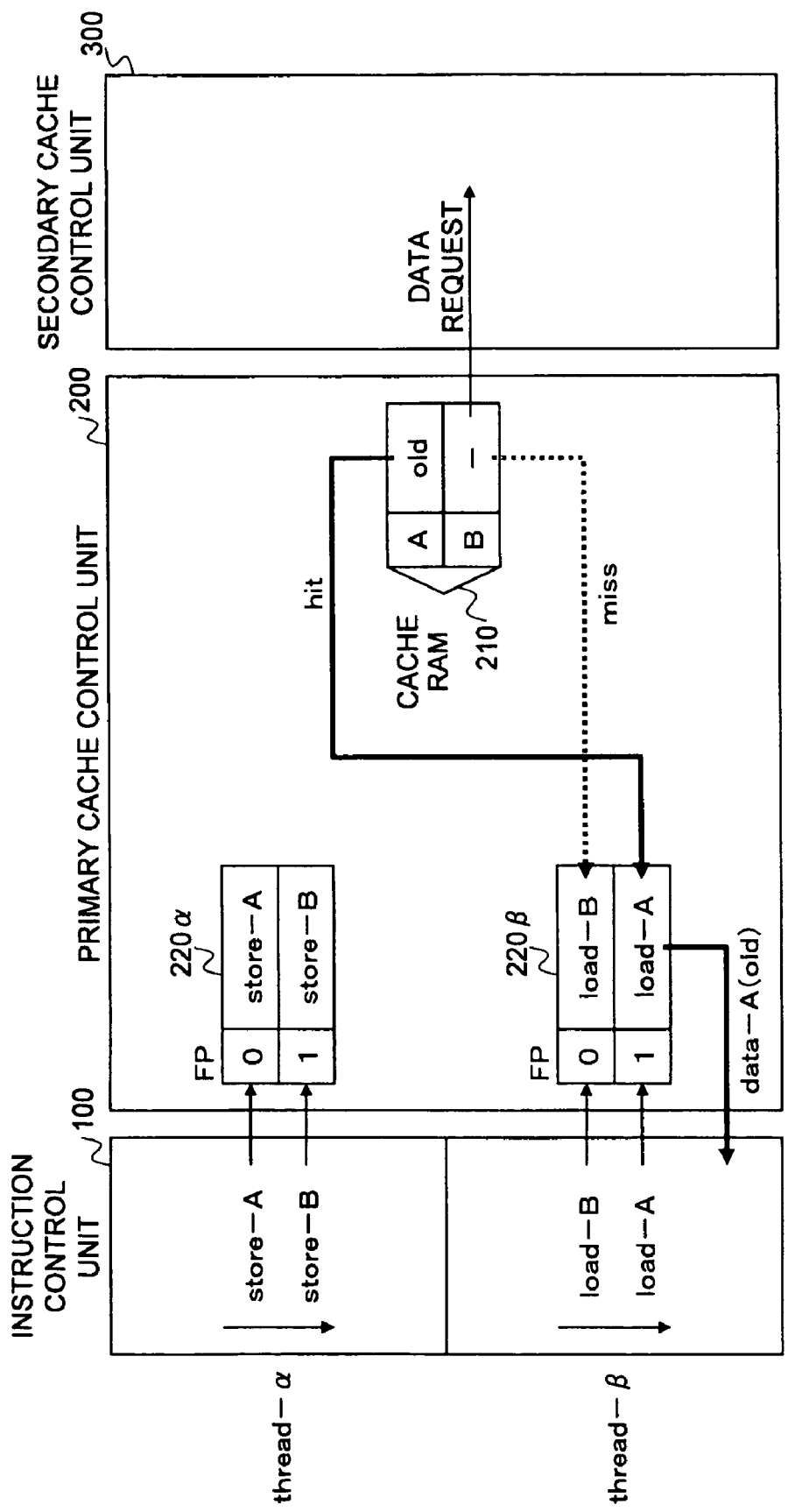

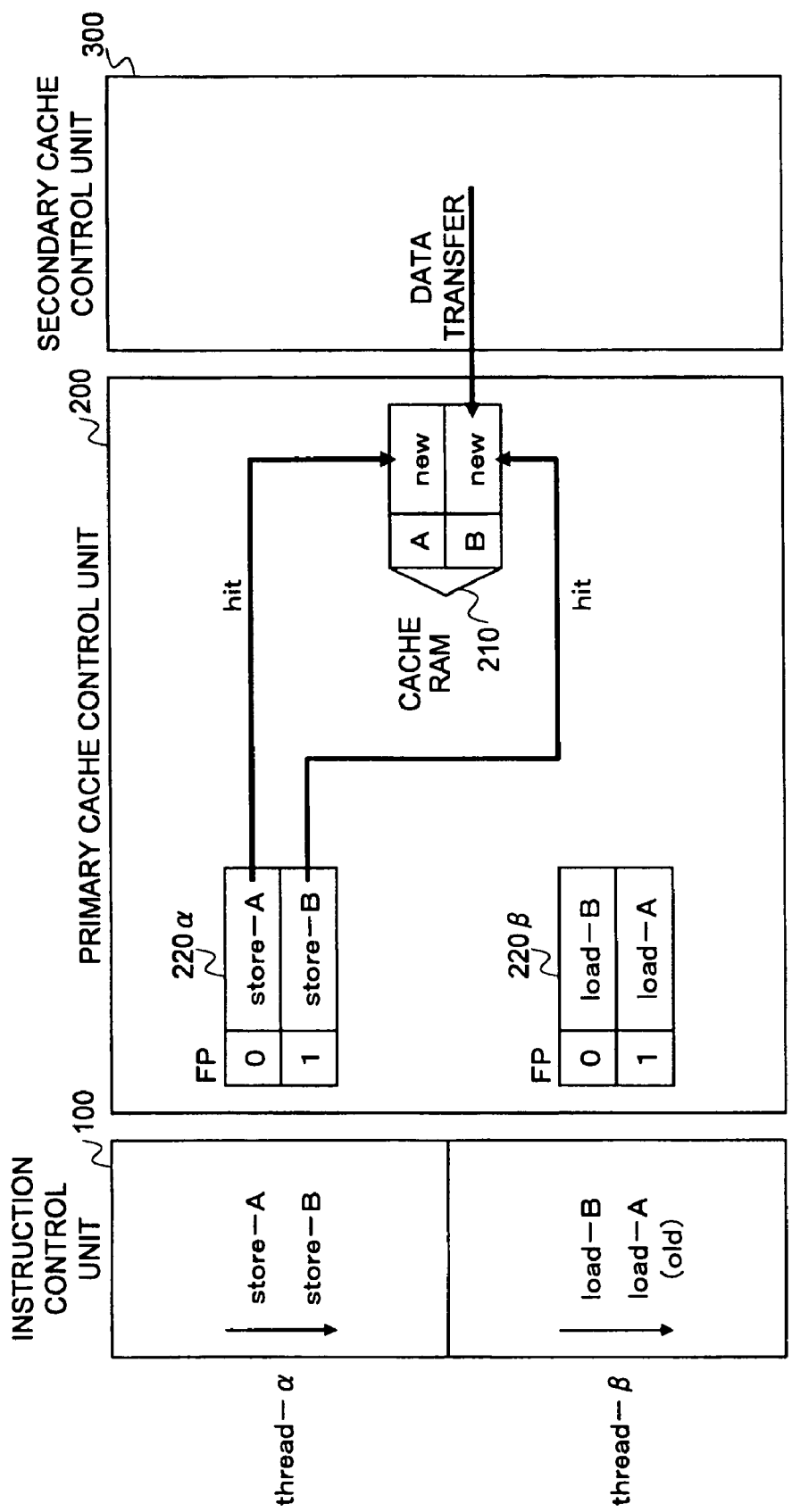

INFORMATION PROCESSING APPARATUS, CACHE MEMORY CONTROLLING APPARATUS, AND MEMORY ACCESS ORDER ASSURING METHOD

CROSS-REFERENCE TO RELATED APPLICATIONS

This is a continuation application of PCT application Ser. No. PCT/JP2007/062389, filed on Jun. 20, 2007.

FIELD

The embodiments discussed herein are related to an information processing apparatus, a cache memory controlling apparatus, and a memory access order assuring method.

BACKGROUND

The TSO (Total Store Ordering) is one type of memory ordering. The TSO has limitations for changing writing order in which data is actually written into a memory with respect to order of instructions which access the memory. There are three TSO rules:
1. A load instruction can not pass a preceding load instruction, which precedes the load instruction, to process the load instruction;
2. A store instruction can not pass a preceding load instruction and the preceding store instruction, both of which precedes the store instruction, to process the store instruction; and
3. An atomic load store instruction can not pass a preceding load instruction and the preceding store instruction, both of which precedes the atomic load store instruction, to process the atomic load store instruction. When a target data is loaded by the atomic load store instruction, an access to the target data from another instruction is restricted from a time the target data is loaded until a time the target data is stored by the atomic load store instruction.

FIG. 9 is a diagram illustrating a passing and no passing pattern between load instructions and between store instructions, which is to be assured by the TSO. As illustrated in #1, the preceding load instruction can not be passed to process the load instruction. As illustrated in #2, the preceding load instruction can not be passed to process the store instruction. As illustrated in #3, the preceding store instruction can be passed to process the load instruction. As illustrated in #4, the preceding store instruction can not be passed to process the store instruction.

In other words, the preceding store instruction can be passed to process the load instruction, but other passing patterns are inhibited. However, when a target data of the load instruction is included in a target data of the preceding store instruction, it is necessary for the load instruction to load the data of the preceding store instruction.

Here, in a processor which processes a memory access out of order, the preceding load instruction can be passed to process the subsequent load instruction, and the data can be returned before the processing of the preceding load instruction to an instruction control unit as follow.

FIG. 10 is a diagram for describing an example of the passing between the load instructions in the processor which executes an out-of-order processing. In the processor which executes the out-of-order processing, an instruction control unit 100 issues an load instruction load-A to a cache control unit 200. When a cache miss occurs on a target data of the load instruction load-A, the cache control unit 200 requests the corresponding data to an external storage means.

Next, the instruction control unit 100 issues a load instruction load-B to the cache control unit 200. When a cache hit occurs on a target data of the load instruction load-B, the cache control unit 200 passes a processing of the preceding load instruction load-A, executes a processing of the subsequent load instruction load-B, and returns data-B, which is the target data of the load instruction load-B, to the instruction control unit 100.

After that, when receiving transferred data from the external storage means, the cache control unit 200 executes the processing of the load instruction load-A, and returns data-A, which is the target data of the load instruction load-A, to the instruction control unit 100.

As described above, in the out-of-order processing, data is not always read from a cache in order of the instructions. However, the instructions are actually executed by the instruction control unit 100 in order of the instructions. Thus, in a processor which supports only single thread, even when the data is read out of order, as long as the TSO between the load/store instructions is observed, it seems from software that the TSO is observed.

However, in an SMT (Simultaneous Multi Thread) processor, a plurality of threads which are simultaneously executed share a primary cache. Then, it becomes necessary to avoid a TSO infringement between the threads in single processor.

The SMT is technique for simultaneously executing the plurality of threads on a single CPU. In other words, the SMT processor is the processor provided with a function for simultaneously executing the plurality of threads. There is a Patent Document 1 which describes the prior art for the SMT processor. The Patent Document 1 describes that consistency of execution order is assured for the reading and the writing of shared data between the threads.

Patent Document 1: WO2004/068361

SUMMARY

According to an aspect of the embodiment, an information processing apparatus includes an instruction control unit, a cache control unit, a processing unit, a determination circuit, and an instruction re-execution request circuit. The instruction control unit controls a plurality of threads, each of the plurality of threads being a sequence of instructions. The cache control unit includes a cache memory. The processing unit processes instructions out of order, and executing the plurality of threads simultaneously, and the instructions include store instructions and load instructions. The determination unit determines whether or not a second thread including a first load instruction and a second load instruction executes the second load instruction before the first load instruction and a target data of the second load instruction is returned to the instruction control unit before the store instruction is executed when a store instruction to the cache memory is executed by a first thread. The instruction re-execution request unit requests the instruction control unit to re-execute instructions from a next instruction of the first load instruction to the second load instruction at a time of processing the first load instruction when the determination unit determines that the target data of the second load instruction is returned to the instruction control unit before the store instruction is executed.

According to the embodiment, in the SMT processor which processes the memory access out of order, order of data update between the threads is assured.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating passing and no passing pattern between a load instruction and a store instruction to be assured by TSO;

FIG. 10 is a diagram for describing an example of the passing between the load instructions in a processor which executes an out-of-order processing;

FIG. 11 is a diagram for describing an example of TSO infringement of the SMT structure;

FIG. 12 is a diagram for describing an example of the TSO infringement of the SMT structure.

DESCRIPTION OF EMBODIMENTS

Figure 13:
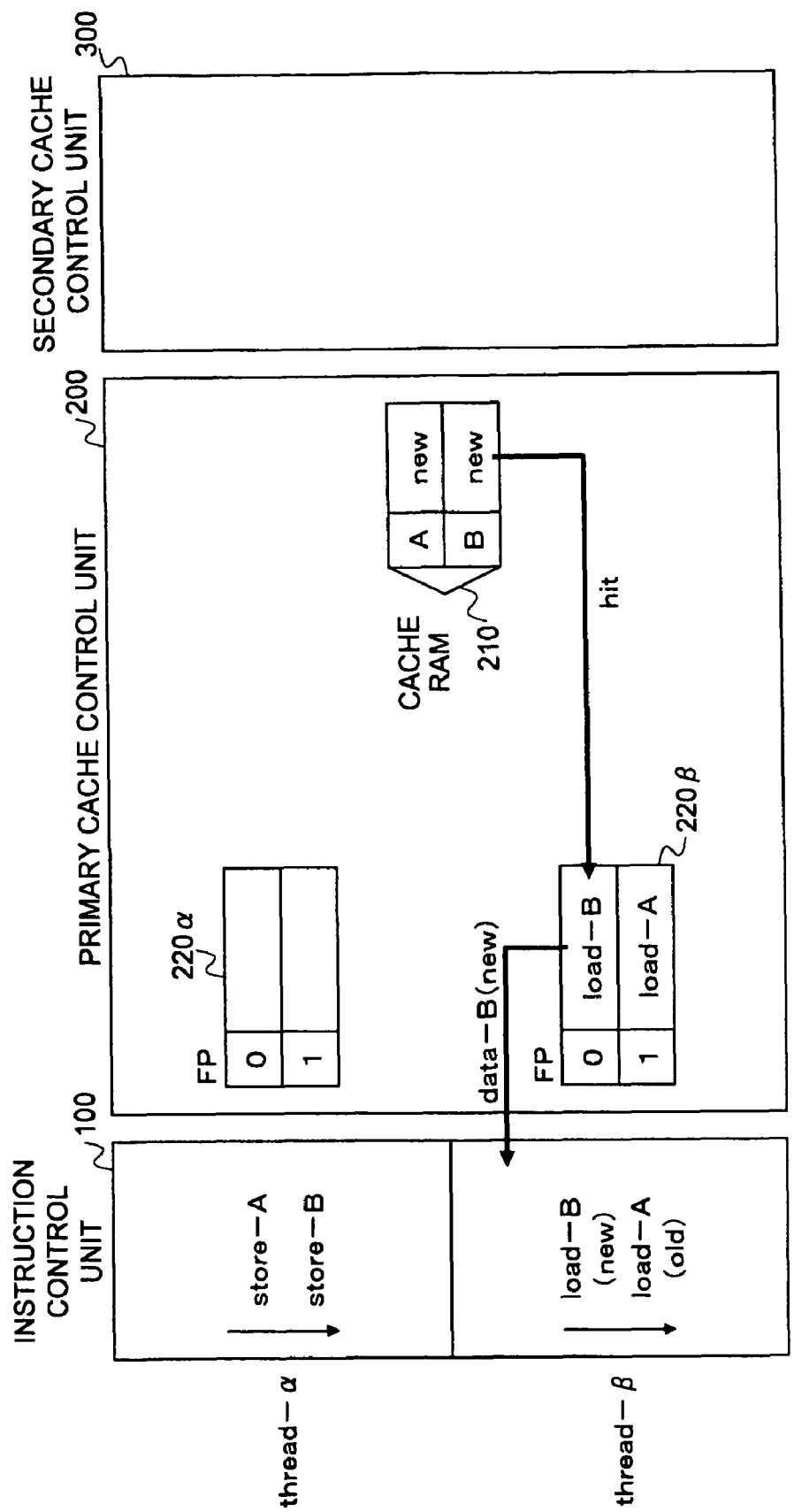
FIG. 13 is a diagram for describing an example of the TSO infringement of the SMT structure.

FIGS. 11 to 13 are diagrams for describing examples of TSO infringement in an SMT structure. In the examples illustrated in FIGS. 11 to 13, a memory access request such as the load instruction and the store instruction is issued from an instruction control unit 100 to a primary cache control unit 200, and is temporarily held in an FP (Fetch Port) 220, which includes a plurality of entries. Here, it is assumed for convenience of the description that the number of the threads in the processor is "2", and the FP 220 is provided in each thread. The instructions issued from the instruction control unit 100 are cyclically assigned to the entry of the FP 220 according to execution order of the instructions. A request held in the FP 220 is read out of order, and target data of the request can be returned from the request, which is read and is to be able to process, to the instruction control unit 100.

Here, a following case is described. That is, there are an area A in which the data does not exist, and an area B in which the data exists, on the cache RAM 210. One thread (thread-α) in a processor issues instructions from the instruction control unit 100 to the primary cache control unit 200 in order of store-A and store-B for the area A and area B. And, another thread (thread-β) in the processor issues instructions from the instruction control unit 100 to the primary cache control unit 200 in order of load-B and load-A for the area B and the area A (refer to FIG. 11).

The store-A and the store-B issued in the thread-α are held in a FP 220α in order of the store-A and the store-B. And, the load-B and the load-A issued in the thread-β are held in a FP 220β in order of the load-B and the load-A. In FIGS. 11 to 13, a number which is indicated in a left side of the instruction held in each FP 220 denotes a number for indicating each entry.

In the primary cache control unit 200, it is assumed that the instruction issued in the thread-β is firstly processed. Then, the area B of the cache RAM 210 is accessed by the preceding load-B in the thread-β. But, data of the area B does not exist in the cache RAM 210, so that a cache miss occurs on the data. Thus, the data of the load-B is requested to a secondary cache control unit 300.

While the target data of the load-B is requested to the secondary cache control unit 300, the area A of the cache RAM 210 is accessed by the subsequent load-A. In this case, a cache hit occurs on the data, and obtained data-A (old) is returned to the instruction control unit 100. In FIG. 11 to 13, such a fact that the data of the area A is described as "old" indicates that the data of the area A is older as compared with the data rewritten by the processing of the subsequent store-A.

After that, as illustrated in FIG. 12, the data of the area B, which is transferred from the secondary cache control unit 300, arrives at the cache RAM 210. Here, it is assumed that the instruction issued in the thread-α is first processed in the primary cache control unit 200 before the load-B of the thread-β is reprocessed. The area A and the area B of the cache RAM 210 are accessed by the store-A and the store-B. In this case, a cache hit occurs on both of the data of the store-A and the store-B, and both of the data of the store-A and the store-B of the cache RAM 210 is updated. In FIGS. 11 to 13, such a fact that the data of the area A and the area B are described as "new" indicates that the data of the area A and the area B are newer as compared with the data which are not rewritten by the processing of the store-A and the store-B.

After that, the load-B of the thread-β is reprocessed in the primary cache control unit 200. When the area B of the cache RAM 210 is accessed by the load-B, a cache hit occurs on the data, and obtained data-B (new) is returned to the instruction control unit 100 (refer to FIG. 13).

As a result, although the instructions are issued in order of the store-A and the store-B in the thread-α, in the thread-β, the stored data is returned in the processing of the load-B, and the pre-stored data is returned in the processing of the load-A. Thus, passing prohibition is infringed between the load instructions in the TSO.

An embodiment provides a technique to solve the above problem, and to assure in the SMT processor for processing a memory access out of order that the order of store processing executed in one thread is reflected to loading processes executed in another thread in the same processor.

To solve the above problem, an SMT processor for simultaneously executing a plurality of threads employs the following. When processing of a subsequent load instruction is executed in one thread before processing of a preceding load instruction and target data of the subsequent load instruction is returned before the processing of the preceding load instruction to an instruction control unit, the execution of storage processing for the target data by another thread may cause the TSO infringement. Therefore, when the preceding load instruction is processed, the instruction control unit is requested to re-execute instructions from next instruction of the preceding load instruction to the above subsequent load instruction, and then the TSO infringement is avoided.

In a cache control unit of the SMT processor for simultaneously executing a plurality of threads, each entry of an FP for each thread is provided with a flag indicating that processing is completed and a flag indicating that it is necessary to re-execute the instruction because of the storage processing in another thread, and each FP of each thread is provided with information indicating an entry which holds the oldest request.

When storage processing is executed in one thread α, an entry in another thread β is extracted which has a target address corresponds to a target address in the executed storage processing and holds a load type instruction whose processing is completed. And, when the entry is extracted, a flag is set indicating that re-execution of the instruction is needed due to the storage processing of another thread for all the entries from a first entry to a second entry. The first entry is an entry which holds the oldest request of the FP of the thread β, or the next entry. The second entry is an entry which has the target address corresponds to the target address in the executed storage processing and holds the processing-completed load type instruction.

When the oldest request of the FP of the thread β is executed, for an instruction held in the entry in which the flag is set indicating that re-execution of the instruction is needed due to the storage processing of another thread, the re-execution request of the instruction is issued to the instruction control unit.

Preferred embodiments of the present invention will be explained with reference to accompanying drawings.

Figure 1:
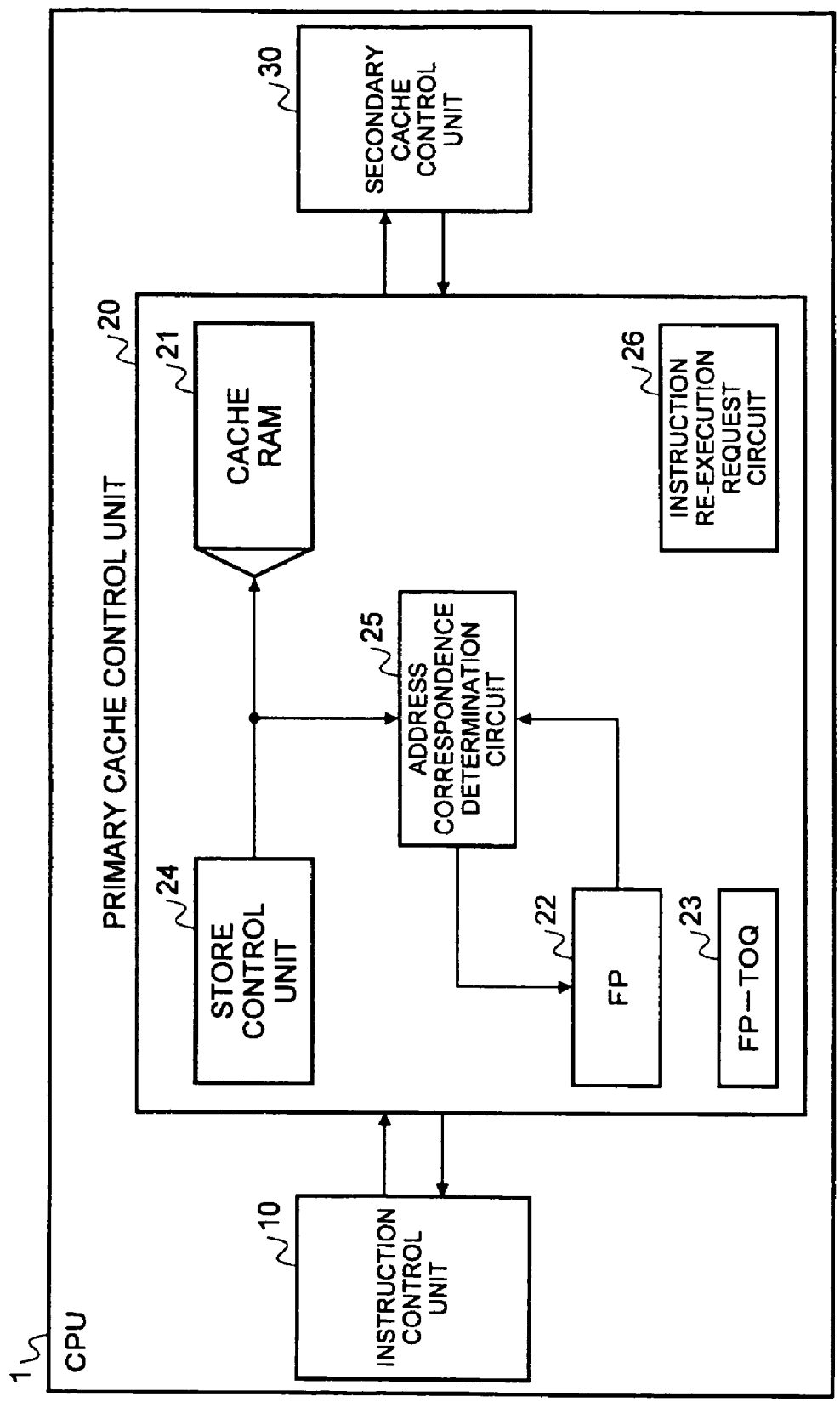
FIG. 1 is a diagram illustrating an exemplary structure of a processor of the present embodiment.

FIG. 1 is a diagram illustrating an exemplary structure of a processor of the present embodiment. A CPU 1 is an SMT processor which can execute a plurality of threads simultaneously or in parallel, and is provided with an instruction control unit 10, a primary cache control unit 20, and a secondary cache control unit 30. The primary cache control unit 20 is provided with a cache RAM 21, an FP (Fetch Port) 22, an FP-TOQ (Fetch Port Top Of Queue) 23, a store control unit 24, an address correspondence determination circuit 25, and an instruction re-execution request circuit 26. A structure of the primary cache control unit 20 of FIG. 1 is illustrated only parts related to the present embodiments. A thread is a sequence of instructions which is executed successively in the CPU 1.

The instruction control unit 10 issues a request such as a load instruction and a store instruction to the primary cache control unit 20. The primary cache control unit 20 executes processing in response to a request from the instruction control unit 10. When data which is a target of the request from the instruction control unit 10 does not exist in the cache RAM 21, the primary cache control unit 20 requests the secondary cache control unit 30 to transfer the corresponding data. When the request from the instruction control unit 10 is a load instruction, the primary cache control unit 20 returns the data to the instruction control unit 10.

The secondary cache control unit 30 receives the request of data transfer from the primary cache control unit 20, and then confirms whether the data requested from the primary cache control unit 20 exists in a cache RAM provided in the secondary cache control unit 30. When the requested data exists, the secondary cache control unit 30 returns the requested data to the primary cache control unit 20. When the data requested from the primary cache control unit 20 does not exist, the secondary cache control unit 30 requests external storage means to transfer the corresponding data.

In the primary cache control unit 20, the cache RAM 21 is storage means with a small capacity and a fast access.

The FP 22 includes a plurality of entries which hold the requests received from the instruction control unit 10. Each entry of the FP 22 is provided with a store-initiated instruction re-execution request flag (RIS: ReIfetch for Store). The instruction issued from the instruction control unit 10 is cyclically assigned to the plurality of entries of the FP 22 according to execution order of the instruction. The requests held in the FP 22 are read out of order, and target data of the read request which can be processed may be returned to the instruction control unit 10. The FP 22 is provided for each parallel-executed thread.

The FP-TOQ 23 is a register which holds information indicating an entry which holds the oldest request among the entries of the FP 22. The FP-TOQ 23 is provided for each parallel-executed thread like the FP 22.

A release timing of the request held in the FP 22 is a processing completion time of the request held in the entry indicated by the FP-TOQ 23. There is a case that processing of the request held in the entry, which is not indicated by the FP-TOQ 23, is completed before the processing of the preceding load instruction by passing processing of the request held in the entry indicated by the FP-TOQ 23. In this case, the request which is processed before the processing of the preceding load instruction is continued to be held in the FP 22 as being indicated to be in a completion status. After that, at the time point that the request held in the entry indicated by the FP-TOQ 23 is completed, the processing-completed entries are collectively released.

When the data on the cache RAM 21 is rewritten by the store instruction, the store control unit 24 notifies the address correspondence determination circuit 25 of a target address of the store instruction.

The address correspondence determination circuit 25 receives the target address of the store instruction from the store control unit 24, and searches the FP 22 of the thread other than the thread to which the store instruction belongs. As a result of the search, when the request is detected which is a load instruction, whose processing is completed, and whose target address corresponds to the received address, the address correspondence determination circuit 25 sets the store-initiated instruction re-execution request flag. This flag is set to all entries from an entry indicated by the FP-TOQ 23 or an entry next to the entry indicated by the FP-TOQ 23 to the entry which holds the detected request. The address correspondence determination circuit 25 may set the store-initiated instruction re-execution request flag to only an entry which holds the detected request.

When processing of the request held in the entry indicated by the FP-TOQ 23 is executed, the instruction re-execution request circuit 26 transfers the re-execution request of the instruction to the instruction control unit 10 for the request held in the entry in which the store-initiated instruction re-execution request flag is set.

Figure 2:
FIG. 2 is a diagram illustrating an example of structure elements of information held in an entry of an FP.

FIG. 2 is a diagram illustrating an example of structure elements of information which is held in the entry of the FP. The example of FIG. 2 illustrates a structure of parts particularly related to the present embodiment of the information held in the entry of the FP 22. Each entry of the FP 22 includes information such as a flag "valid", a flag "status", an instruction code (opcode), "address", and the above store-initiated instruction re-execution request flag (RIS). The flag "valid" indicates whether the entry is released or not, in other words, whether the held request is invalid or valid. The flag "status" indicates whether the processing of the held request is completed, or is not completed. The instruction code (opcode) indicates a type of the instruction such as the load instruction and the store instruction. The "address" is a target of the instruction.

In the present embodiment, it is assumed that the "valid" becomes "0" when the held request is invalid, and becomes "1" when the held request is valid. It is assumed that the "status" becomes "incomplete" when the processing of the held request is not completed, and becomes "complete" when the processing of the held request is completed. It is assumed that the store-initiated instruction re-execution request flag is "0" in the case of default, and becomes "1" in the case of flag set.

Figure 3:
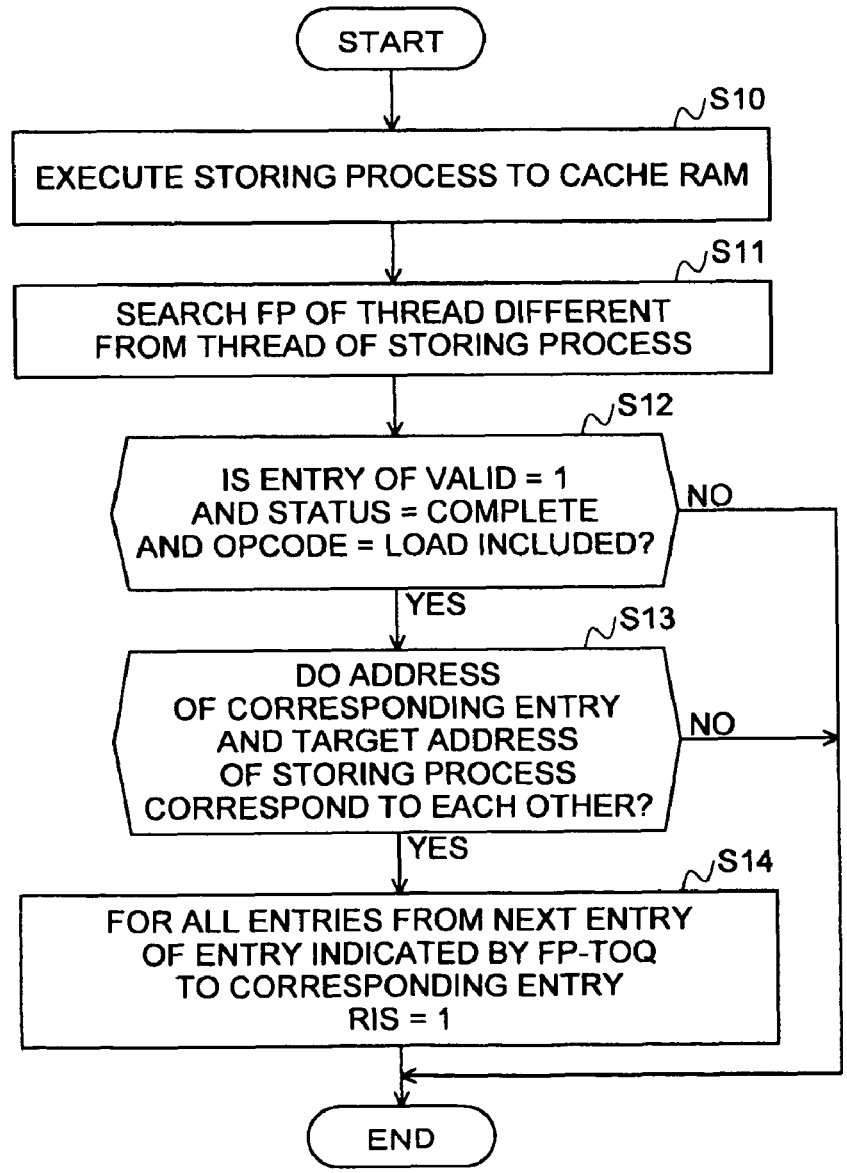
FIG. 3 is a setting processing flowchart of a store-initiated instruction re-execution request flag of the present embodiment.

FIG. 3 is a setting processing flowchart of the store-initiated instruction re-execution request flag of the present embodiment. When storage processing to the cache RAM 21 is executed (step S10), the FP 22 of the thread is searched which is different from the thread in which the storage processing is executed (step S11).

When an entry, in which the "valid" is "1", the "status" is "complete", and the "opcode" is the load type instruction, does not exist in the searched FP 22 (step S12 No), the store-initiated instruction re-execution request flag (RIS) is not set.

When the entry, in which the "valid" is "1", the "status" is "complete", and the "opcode" is the load type instruction, exists in the searched FP 22 (step S12 Yes), and when the "address" of the entry and the target address in the executed storage processing correspond to each other (step S13 Yes), the store-initiated instruction re-execution request flag (RIS) is set to all the entries from a next entry of the entry indicated by the FP-TOQ23 to the corresponding entry (step S14).

Even when the entry, in which the "valid" is "1", the "status" is "complete", and the "opcode" is the load type instruction, exists in the searched FP 22 (step S12 Yes), and when the "address" of the entry and the target address in the executed storage processing does not correspond to each other (step S13 No), the store-initiated instruction re-execution request flag (RIS) is not set.

Figure 4:
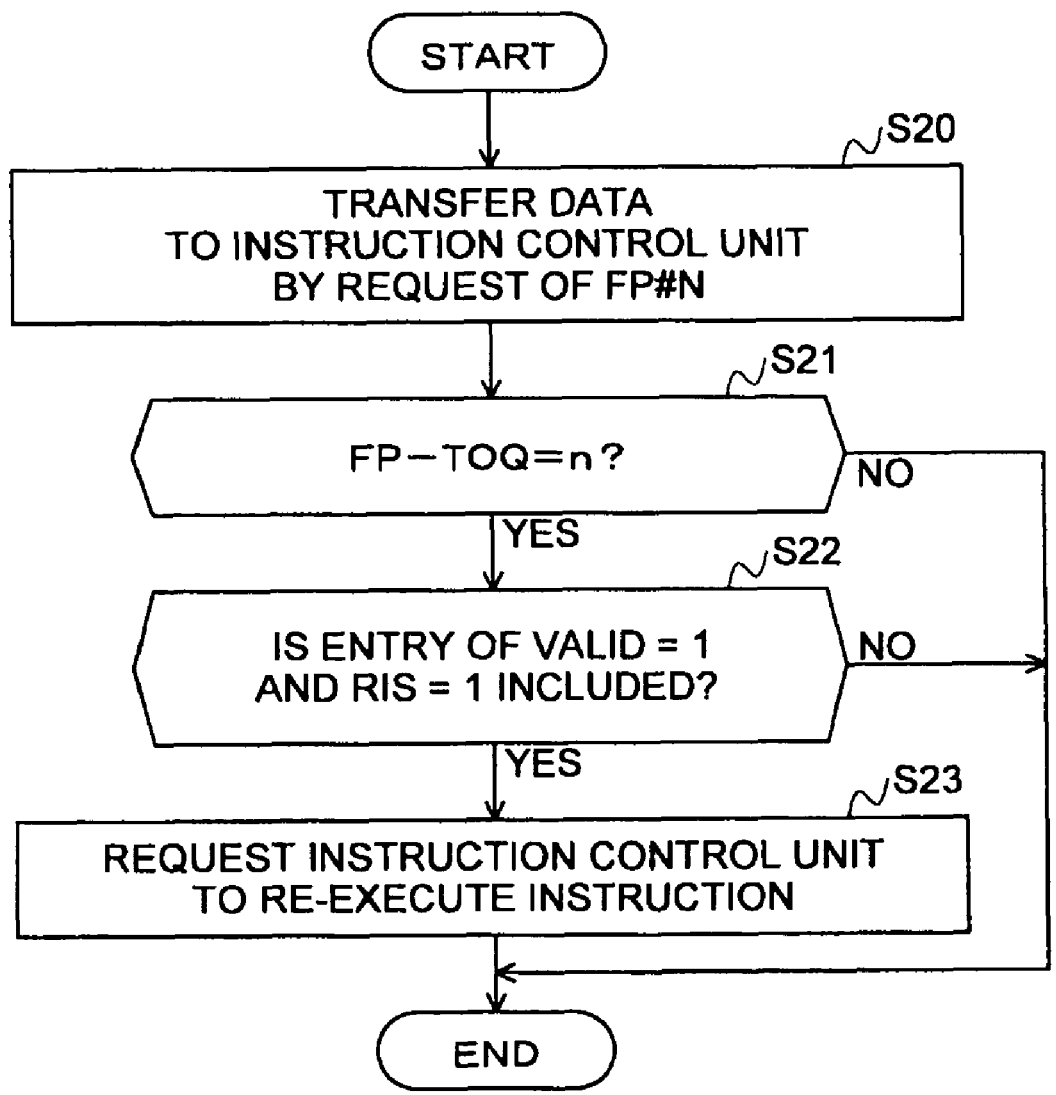
FIG. 4 is an instruction re-execution request processing flowchart of the present embodiment.

FIG. 4 is an instruction re-execution request processing flowchart of the present embodiment. In the flowchart of FIG. 4, FP#n (n=0, 1, 2, ... ) indicates each entry of the FP 22, and n (n=0, 1, 2, ... ) indicates a number which is conveniently assigned to the entry.

The data is transferred to the instruction control unit 10 by the request held in the entry FP#n (step S20). Then, when the entry FP#n is the entry indicated by the FP-TOQ23 (step S21 Yes), and when the entry, in which the "valid" is "1", and the instruction re-execution request flag (RIS) is "1", exists in the FP 22 of the thread including the entry FP#n (step S22 Yes), the instruction control unit 10 is requested to re-execute the instruction for all the requests held in the corresponding entry (step S23).

FIGS. 5 to 8 are diagrams for describing examples of TSO infringement avoidance of an SMT structure. Here, more particular example of the processing performed by the primary cache control unit 20 of the present embodiment is described by using FIGS. 5 to 8. In the examples illustrated in FIGS. 5 to 8, a memory access request such as the load instruction and the store instruction, which is issued from the instruction control unit 10 to the primary cache control unit 20, is temporarily held in the FP 22. Here, it is assumed for convenience of the description that the number of the threads in the processor is "2", and the FP 22 is provided for each thread.

Figure 5:
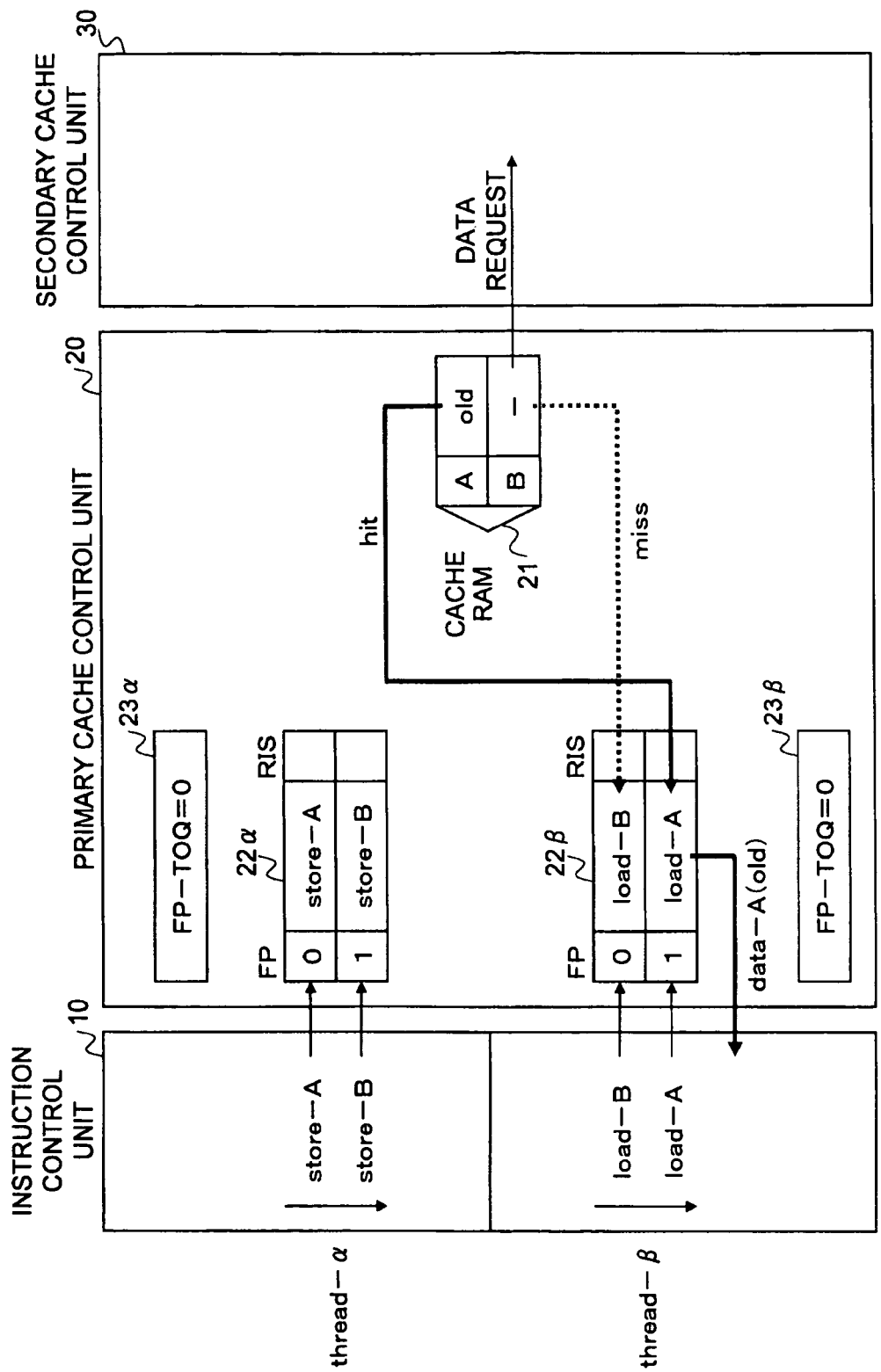
FIG. 5 is a diagram for describing an example of TSO infringement avoidance of an SMT structure.
Figure 6:
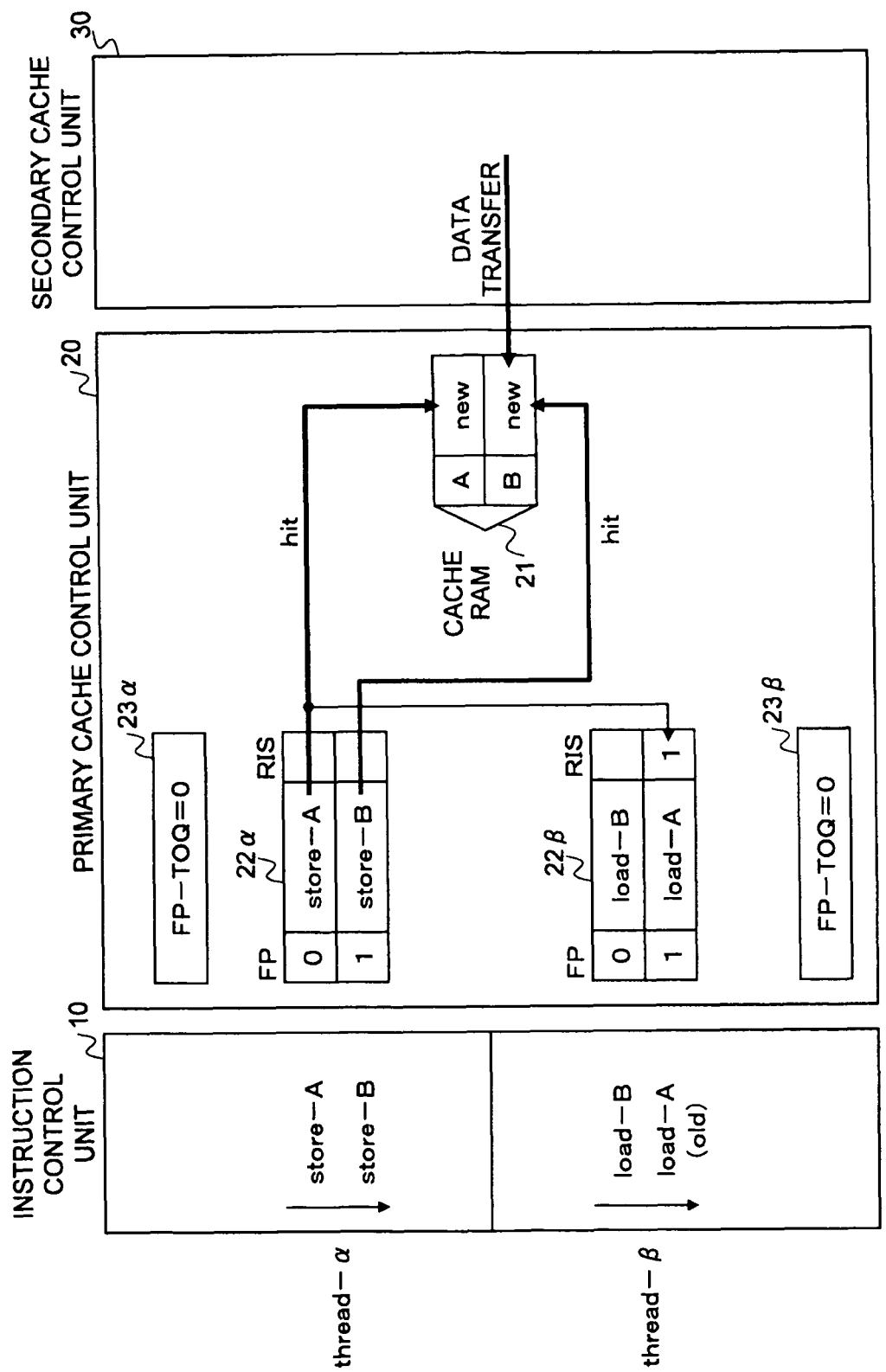
FIG. 6 is a diagram for describing an example of the TSO infringement avoidance of the SMT structure.
Figure 7:
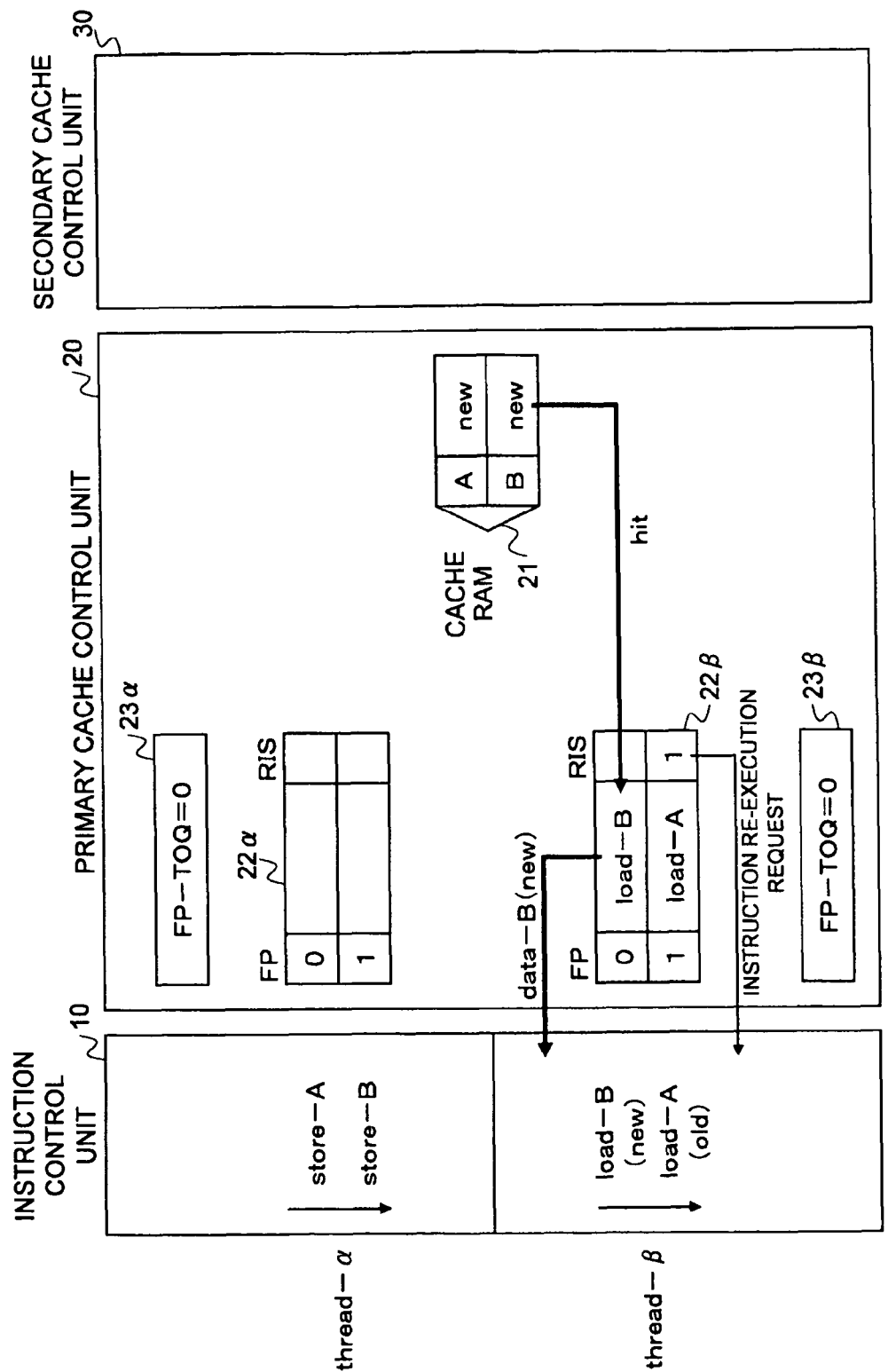
FIG. 7 is a diagram for describing an example of the TSO infringement avoidance of the SMT structure.
Figure 8:
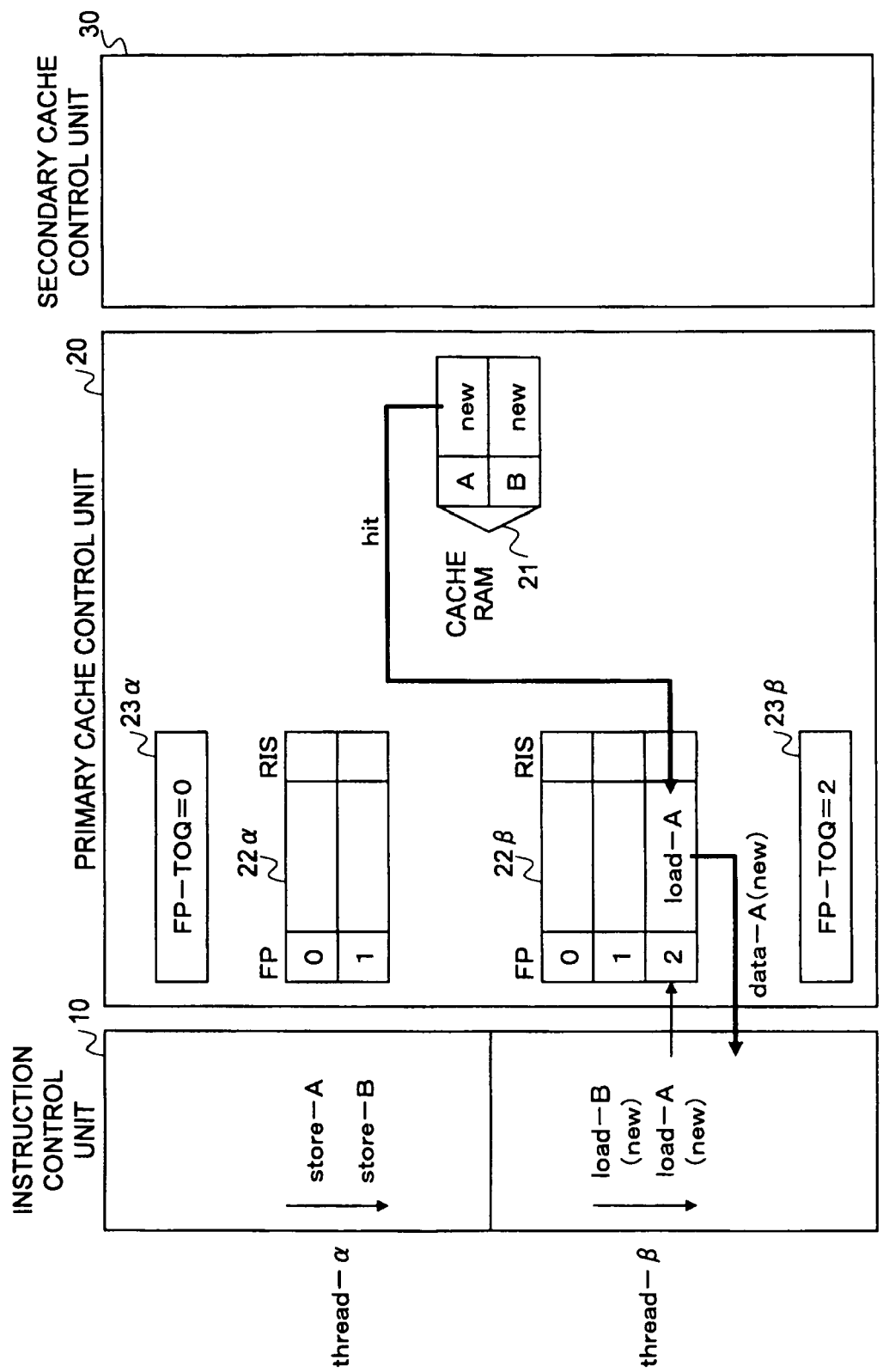
FIG. 8 is a diagram for describing an example of the TSO infringement avoidance of the SMT structure.

In the examples illustrated in FIGS. 5 to 8, such a case is described that, for an area A in which the data does not exist on the cache RAM 21 and an area B in which the data exists on the cache RAM 21, requests are executed in order of store-A and store-B in a thread-α, and requests are executed in order of load-B and load-A in a thread-β (refer to FIG. 5).

It is assumed that, with regard to instructions issued from the instruction control unit 10 in the thread-α, the store-A is held in the 0-th entry (hereinafter, described as FPα#0) of FP22α, the store-B is held in the 1-th entry (hereinafter, described as FPα#1) of FP22α, and FP-TOQ23α of the FP22α indicates the entry FPα#0. It is assumed that, with regard to the instruction issued from the instruction control unit 10 in the thread-β, the load-B is held in the 0-th entry (hereinafter, described as FPβ#0) of FP22β, the load-A is held in the 1-th entry (hereinafter, described as FPβ#1) of FP22β, and FP-TOQ23β of the FP22β indicates the entry FPβ#0 (refer to FIG. 5). In FIGS. 5 to 8, a number indicated in a left side of the instruction held in each FP 22 denotes a number for indicating each entry.

It is basically in random order that the request is first issued from which of the FP22α and the FP22β, and the request held in which entry is first processed in the FP22α and the FP22β. Here, it is assumed that the request held in the entry is processed in order of the FPβ#0, the FPβ#1, the FPα#0, and the FPα#1.

The primary cache control unit 20 firstly executes processing of the load-B held in the FPβ#0. However, data does not exist in the area B of the cache RAM 21, so that a cache miss occurs on the data. Then, the primary cache control unit 20 requests the secondary cache control unit 30 or a main memory (not-illustrated) to transfer the data (refer to FIG. 5).

By the time that the requested data arrives at the cache RAM 21, the processing of the load-A held in the FPβ#1 is started, and a cache hit occurs on the data. Thus, the data of the area A of the cache RAM 21 is read, and the obtained data-A (old) is returned to the instruction control unit 10 (refer to FIG. 5). At this time point, in the thread-β, the processing of the load-A passes the processing of the load-B, and returns the data to the instruction control unit 10. In FIGS. 5 to 8, such a fact that the data of the area A is described as "old" in the diagram indicates that such a data is older as compared with the data rewritten by the subsequent processing of the store-A.

And, at this time point, the processing of the load-A held in the FPβ#1 is completed, but the processing of the load-B held in the FPβ#0 indicated by the FP-TOQ23β is not completed. Accordingly, at this time point, the flag of the processing completion is set to the FPβ#1, but the FPβ#1 is not released.

After that, the processing of the store-A held in the FPα#0 of the thread-α is executed, and the data is written in the area A of the cache RAM 21. When the data is written for this store-A, the addresses of all the processing-completed requests are checked which are held in the FP 22 of the thread other than the thread-α. In this case, the addresses of the FP22β of the thread-β are checked. And, when an entry which holds the request of the address corresponding to the area A exists, the store-initiated instruction re-execution request flag (RIS) is set to all entries from an entry indicated by the FP-TOQ23β of the FP22β or an entry next to the entry indicated by the FP-TOQ23β of the FP22β to the corresponding entry. In this case, the entry FPβ#1 which holds the request of the address corresponding to the area-A exists, so that the store-initiated instruction re-execution request flag (RIS) is set to the entries from the FPβ#0 indicated by the FP-TOQ23β of the FP22β to the FPβ#1, or set to only the entry FPβ#1 (refer to FIG. 6). In FIGS. 5 to 8, "1" is set to the RIS of the entry of the FPβ#1.

After that, the data including the area B arrives at the primary cache control unit 20 from the secondary cache control unit 30, and is written in the area B of the cache RAM 21. The processing of the store-B held in the FPα#1 of the thread-α is executed, and the data is written in the area B of the cache RAM 21 (refer to FIG. 6). In FIGS. 5 to 8, such a fact that the data of the area A and the area B is described as "new" indicates that such data is newer as compared with the data before rewriting by the processing of the store-A and the store-B.

After that, the re-processing of the load-B held in the FPβ#0 of the thread-β is executed, and a cache hit occurs on the data. Then, the data of the area B of the cache RAM 21 is read, and the obtained data-B (new) is returned to the instruction control unit 10. In this case, the FPβ#0 is the entry indicated by the FP-TOQ23β. Thus, for the entry in which the store-initiated instruction re-execution request flag (RIS) is set, the re-execution request of the instruction is issued to the instruction control unit 10 (refer to FIG. 7). However, it is not needed to issue the re-execution request of the instruction for FPβ#0 which is the entry indicated by the FP-TOQ23β. The processing of the FPβ#0 which is the entry indicated by the FP-TOQ23β is completed, so that all the entries which holds the processing-completed request of the FP22β are released.

The load-A is again requested as the thread-β from the instruction control unit 10, and the request is held in the second entry (hereinafter, described as FPβ#2) of the FP22β. Then, processing of the load-A held in the FPβ#2 is executed, and a cache hit occurs on the data. Thus, the data of the area A of the cache RAM 21 is read, and the obtain data-A (new) is returned to the instruction control unit 10 (refer to FIG. 8). Thereby, the stored data by the processing of the store-A of the thread-α is returned to the instruction control unit 10.

In a case that the above mechanism for the store-initiated instruction re-execution does not employed, the state in which the data returned to the instruction control unit 10 in the processing of the load-B of the thread-β is the stored data but the data returned in the processing of the load-A is the pre-stored data. This state seems from software that the processing order of the store-A and the store-B of the thread-α is reversed, so that it results in the TSO infringement. Since the store-initiated instruction re-execution is executed, the stored data of the thread-α is returned in the processing of both the load-A and the load-B of the thread-β, so that the TSO infringement can be avoided.

The information processing apparatus, the cache memory controlling apparatus, and the memory access order assuring method are related to the technique used by the information processing apparatus, and particularly, to the technique used by a computer including a cache.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An operation processing apparatus executing a store instruction for accessing a memory and a load instruction in random order when an execution in random order is available, the store instruction and the load instruction being included in a thread that is a sequence of instructions, the operation processing apparatus comprising:
    a first thread execution unit that executes a first thread including a store instruction;
    a second thread execution unit that executes a second thread including a first load instruction and a second load instruction that precedes the first load instruction;
    a cache memory that is shared by the first thread execution unit and the second thread execution unit;
    an instruction control unit controlling the first thread execution unit and the second thread execution unit;
    a determination unit that determines, when the first thread execution unit executes the store instruction to a target address of the cache memory, whether the second thread execution unit executes the first load instruction to the target address before the second load instruction and returns a target data of the first load instruction to the instruction control unit before the store instruction is executed; and
    an instruction re-execution request unit that requests the instruction control unit to re-execute instructions from a next instruction of the second load instruction by the second thread execution unit at a time when the second thread execution unit executes the second load instruction, when the determination unit determines that the second thread execution unit executes the first load instruction to the target address before the second load instruction and returns the target data of the first load instruction to the instruction control unit before the store instruction is executed.

2. The operation processing apparatus according to claim 1, further comprising:
    an instruction holding unit having a plurality of entries, each entry storing instructions included in the second thread executed by the second thread execution unit, an address of the second load instruction, and re-execution request flags indicating to request re-execution of instructions included in the second thread; and
    a top entry number holding unit indicating an entry that holds an oldest instruction among the plurality of entries,
    wherein, in a case that the first thread execution unit executes the store instruction to the target address of the cache memory, the determination unit sets, when the first load instruction to the target address is searched from one of the plurality of entries of the instruction holding unit, re-execution request flags from a next entry of the entry indicated by the top entry number holding unit to an entry that is searched.

3. The operation processing apparatus according to claim 2, wherein the instruction re-execution request unit requests, when the second load instruction is stored in an entry indicated by the top entry number holding unit, the instruction control unit to re-execute instructions from an instruction stored in a next entry of the entry indicated by the top entry number holding unit to the first load instruction.

4. A control method in an operation processing apparatus which comprises a thread executer that executes a first thread including a store instruction and a second thread including a first load instruction and a second load instruction that precedes the first load instruction, a cache memory that is shared by the first and second threads, and an instruction controller that controls the first and second threads and which executes a store instruction for accessing a memory and a load instruction in random order when an execution in random order is available, the control method comprising:
    executing in the first thread the store instruction to a target address of the cache memory;
    determining whether the second thread executes the first load instruction to the target address before the second load instruction and returns a target data of the first load instruction to the instruction controller before the store instruction is executed; and controlling re-execution, by the second thread, instructions from a next instruction of the second load instruction at a time when the second thread executes the second load instruction, when determined that the second thread executes the first load instruction to the target address before the second load instruction and returns the target data of the first load instruction to the instruction controller before the store instruction is executed.

5. The control method according to claim 4, wherein:

the operation processing apparatus further comprises an instruction holding unit having a plurality of entries each of which stores instructions included in the second thread, an address of the second load instruction, and re-execution request flags indicating to request re-execution of instructions included in the second thread, and a top entry number holding unit indicating an entry that holds an oldest instruction among the plurality of entries, and in a case that the first thread executes the store instruction to the target address of the cache memory, the determining sets, when the first load instruction to the target address is searched from one of the plurality of entries of the instruction holding unit, re-execution request flags from a next entry of the entry indicated by the top entry number holding unit to an entry that is searched.

6. The control method according to claim 5, wherein re-executing re-executes instructions from an instruction stored in a next entry of the entry indicated by the top entry number holding unit to the first load instruction, when the second load instruction is stored in an entry indicated by the top entry number holding unit.

* * * * *